United States Patent
Down et al.

(10) Patent No.: US 10,451,417 B2
(45) Date of Patent: Oct. 22, 2019

(54) ACQUISITION AND/OR TRACKING OF REMOTE OBJECT

(71) Applicant: OPENWORKS ENGINEERING LTD, Northumberland (GB)

(72) Inventors: Christopher David Down, Newcastle (GB); Neil Rockcliffe Armstrong, Rowlands Gill (GB); James Edward Cross, Blaydon (GB); Alexander James Wilkinson, Newcastle (GB); Roland Sebastian Wilkinson, Newcastle (GB)

(73) Assignee: OPENWORKS ENGINEERING LTD, Northumberland (GB)

( * ) Notice: Subject to any disclaimer, the term of this patent is extended or adjusted under 35 U.S.C. 154(b) by 0 days.

(21) Appl. No.: 15/788,193

(22) Filed: Oct. 19, 2017

(65) Prior Publication Data

US 2018/0128609 A1 May 10, 2018

(30) Foreign Application Priority Data

Oct. 25, 2016 (GB) .................................. 1618045.7

(51) Int. Cl.
*G01C 3/08* (2006.01)
*G01C 3/32* (2006.01)
(Continued)

(52) U.S. Cl.
CPC ................. *G01C 3/08* (2013.01); *G01C 3/32* (2013.01); *G01S 7/4808* (2013.01);
(Continued)

(58) Field of Classification Search
CPC .. G01C 3/08; G01C 3/32; G06F 17/18; H04B 7/26
(Continued)

(56) References Cited

U.S. PATENT DOCUMENTS

| 5,128,684 A | 7/1992 | Brown |
| 5,631,654 A | 5/1997 | Karr |

(Continued)

FOREIGN PATENT DOCUMENTS

EP 2881755 A1 6/2015

OTHER PUBLICATIONS

European Search Report for corresponding European Application No. 17198404.0, dated Mar. 8, 2018.
(Continued)

*Primary Examiner* — Yazan A Soofi
(74) *Attorney, Agent, or Firm* — Jason H. Vick; Sheridan Ross, PC

(57) ABSTRACT

A method for acquiring a remote object is provided. The method comprises obtaining a sequence of position samples of the remote object, identifying one or more sets of spatially clustered position samples from among the obtained position samples, and applying curve-fitting to at least one set of spatially clustered position samples to obtain a trajectory of the set of spatially clustered position samples. Also provided is a method for tracking a remote object. The method comprising obtaining an estimated trajectory of the object, obtaining one or more position samples of the object, comparing the obtained position samples with positions computed based on the estimated trajectory, and determining that the object is being tracked based on whether the obtained position samples are consistent with the computed positions.

20 Claims, 4 Drawing Sheets

(51) Int. Cl.
*G06F 17/18* (2006.01)
*H04B 7/26* (2006.01)
*G01S 17/02* (2006.01)
*G01S 17/42* (2006.01)
*G01S 17/66* (2006.01)
*G01S 7/48* (2006.01)

(52) U.S. Cl.
CPC ............ *G01S 17/023* (2013.01); *G01S 17/42* (2013.01); *G01S 17/66* (2013.01); *G06F 17/18* (2013.01); *H04B 7/26* (2013.01)

(58) Field of Classification Search
USPC ......................................................... 701/519
See application file for complete search history.

(56) References Cited

U.S. PATENT DOCUMENTS

| | | | |
|---|---|---|---|
| 2002/0008657 A1* | 1/2002 | Poore, Jr. .............. | G01S 3/7864 342/96 |
| 2008/0319672 A1 | 12/2008 | Welty | |
| 2009/0079960 A1 | 3/2009 | Chung | |
| 2010/0149020 A1 | 6/2010 | Arnold et al. | |
| 2010/0271615 A1* | 10/2010 | Sebastian ............... | G01C 11/02 356/4.01 |
| 2011/0060478 A1 | 3/2011 | Nickolaou | |
| 2011/0231016 A1* | 9/2011 | Goulding ............... | G06N 3/008 700/246 |
| 2012/0233000 A1* | 9/2012 | Fisher .................... | G06Q 30/02 705/14.71 |
| 2013/0107243 A1 | 5/2013 | Ludwig et al. | |
| 2013/0229298 A1* | 9/2013 | Eckstein ............... | G01S 13/726 342/107 |
| 2018/0139565 A1* | 5/2018 | Norris .................... | H04S 7/304 |

OTHER PUBLICATIONS

Search Report for corresponding Great Britain Application No. 1618045.7, dated Mar. 9, 2018.

* cited by examiner

ACQUISITION AND/OR TRACKING OF REMOTE OBJECT

CROSS REFERENCE TO RELATED APPLICATIONS

This application claims the benefit under 35 U.S.C. 119(a) to Great Britain Patent Application No. 1618045.7 filed Oct. 25, 2016, the entire disclosure of which is incorporated herein by reference in its entirety.

FIELD OF THE INVENTION

Certain exemplary embodiments provide a technique for acquisition of a remote object using a rangefinder. Certain exemplary embodiments provide a technique for tracking a remote object using a rangefinder.

BACKGROUND OF THE INVENTION

A rangefinder is a device capable of measuring the line-of-sight distance to a remote object. Rangefinders may employ various types of technology, for example based on laser, radar or sonar. In a typical laser rangefinder using a time-of-flight technique, the rangefinder transmits a laser pulse towards a target object, and the time taken for the pulse to be reflected off the object and travel back to a detector of the rangefinder is used to compute the distance to the object. Typically, a rangefinder transmits a sequence of laser pulses periodically at a relatively high frequency (e.g. 200 Hz) to obtain periodic samples of the distance. The samples obtained over a certain time window may be filtered, for example by averaging, to obtain a measured distance.

One problem with conventional laser rangefinders is that, due to movement of the operator and/or movement of the target object, it may be difficult for the operator to keep the laser beam directed exactly at the target object. This may result in null data, for example if the beam is pointed at a location (e.g. the sky) where the beam is not reflected back to the rangefinder. It may also result in spurious data, for example if the beam is pointed at an object (e.g. a foreground or background object) other than the target object. Consequently, any measured distance may be unreliable. This difficulty may be increased when the target object is a relatively large distance away and/or if the target object is moving relatively quickly.

Furthermore, it may be difficult for the operator to know whether the target object has been validly acquired, that is whether the beam is directed at the target object in a sufficiently accurate and stable manner so as to achieve a reliable distance measurement. If the target object is moving, it may be difficult for the operator to know whether the target object is being validly tracked, that is whether the beam is moved so as to follow the target object in a sufficiently accurate and stable manner so as to achieve continuous distance measurements.

What is desired is a technique for obtaining more reliable distance measurements using a rangefinder. What is also desired is a technique for determining when a target object has been validly acquired. What is also desired is a technique for determining when a target object is being validly tracked.

SUMMARY OF THE INVENTION

It is an aim of certain embodiments of the present invention to address, solve, mitigate or obviate, at least partly, at least one of the problems and/or disadvantages associated with the related art, for example at least one of the problems and/or disadvantages mentioned herein. Certain embodiments of the present invention aim to provide at least one advantage over the related art, for example at least one of the advantages mentioned herein.

The present invention is defined by the independent claims. A non-exhaustive set of advantageous features that may be used in various exemplary embodiments of the present invention are defined in the dependent claims.

In accordance with an aspect of the present invention, there is provided a method according to claim 1.

Other aspects, advantages, and salient features of the present invention will become apparent to those skilled in the art from the following detailed description, which, taken in conjunction with the annexed drawings, disclose exemplary embodiments of the present invention.

DETAILED DESCRIPTION OF EXEMPLARY EMBODIMENTS

Figure 1:
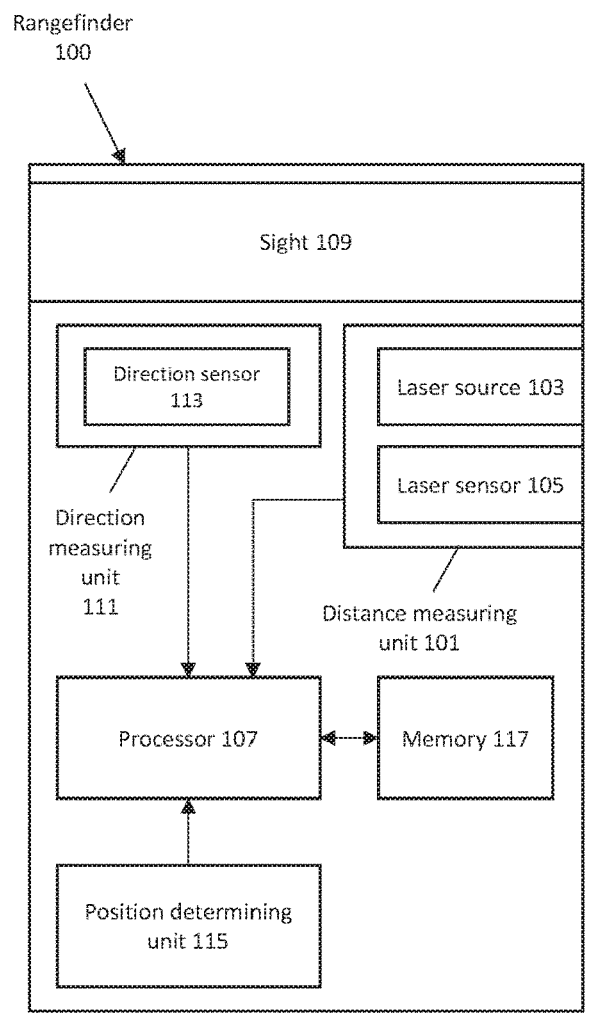
FIG. 1 is a schematic diagram of a rangefinder according to an exemplary embodiment.

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the present invention, as defined by the claims.

The terms and words used in this specification are not limited to the bibliographical meanings, but, are merely used to enable a clear and consistent understanding of the present invention.

The same or similar components may be designated by the same or similar reference numerals, although they may be illustrated in different drawings.

Detailed descriptions of elements, features, components, structures, constructions, functions, operations, processes, characteristics, properties, integers and steps known in the art may be omitted for clarity and conciseness, and to avoid obscuring the subject matter of the present invention.

Throughout this specification, the words "comprises", "includes", "contains" and "has", and variations of these words, for example "comprise" and "comprising", means "including but not limited to", and is not intended to (and does not) exclude other elements, features, components, structures, constructions, functions, operations, processes, characteristics, properties, integers, steps and/or groups thereof.

Throughout this specification, the singular forms "a", "an" and "the" include plural referents unless the context dictates otherwise. For example, reference to "an object" includes reference to one or more of such objects.

By the term "substantially" it is meant that the recited characteristic, parameter or value need not be achieved exactly, but that deviations or variations, including for example, tolerances, measurement errors, measurement accuracy limitations and other factors known to those of skill in the art, may occur in amounts that do not preclude the effect the characteristic, parameter or value was intended to provide.

Throughout this specification, language in the general form of "X for Y" (where Y is some action, process, function, activity, operation or step and X is some means for carrying out that action, process, function, activity, operation or step) encompasses means X adapted, configured or arranged specifically, but not exclusively, to do Y.

Elements, features, components, structures, constructions, functions, operations, processes, characteristics, properties, integers, steps and/or groups thereof described herein in conjunction with a particular aspect, embodiment, example or claim are to be understood to be applicable to any other aspect, embodiment, example or claim disclosed herein unless incompatible therewith.

It will be appreciated that embodiments of the present invention can be realized in the form of hardware or a combination of hardware and software. Any such software may be stored in any suitable form of volatile or non-volatile storage device or medium, for example a ROM, RAM, memory chip, integrated circuit, or an optically or magnetically readable medium (e.g. CD, DVD, magnetic disk or magnetic tape). It will also be appreciated that storage devices and media are embodiments of machine-readable storage that are suitable for storing a program or programs comprising instructions that, when executed, implement embodiments of the present invention.

The following exemplary embodiments will be described below with reference to a laser rangefinder. However, the skilled person will appreciate that the principles and techniques described herein may be applied to other types of rangefinder, or to devices for measuring object distances and positions other than rangefinders.

FIG. 1 illustrates a rangefinder according in an exemplary embodiment. The rangefinder 100 comprises a distance measuring unit 101 for measuring the line-of-sight distance to a target object. The distance measuring unit 101 includes a laser source 103 for transmitting a laser beam pulse towards the target object and a laser sensor 105 for detecting a reflected pulse from the target object.

The rangefinder 100 also comprises a processor 107 including timing circuitry for computing the distance to the target object based on the time difference between the laser source 103 transmitting the pulse and the laser sensor 105 receiving the reflected pulse.

The rangefinder may also comprise a sight 109 to assist the operator in aiming the laser beam towards the target object.

The distance measuring unit 101 is configured to obtain a sequence of samples of the distance to the target object. To achieve this, the laser source 103 may be configured to transmit a sequence of laser pulses (e.g. periodically) at a certain frequency (e.g. 200 Hz). A sample of the distance from the rangefinder to the target object ("distance sample") may be obtained from each pulse, and the processor 107 is configured to collect distance samples corresponding to respective pulses. In certain embodiments, the pulse frequency may be varied. For example, the pulse frequency may be set by the operator.

The rangefinder 100 also comprises a direction measuring unit 111 for measuring the direction of the target object. The direction measuring unit 111 includes a direction sensor 113 for measuring the direction of the laser beam (and hence the direction of the target object assuming that the laser beam is aimed at the target object). For example, the direction sensor 113 may comprise one or more (e.g. three) accelerometers, one or more (e.g. three) gyroscopes, and/or a magnetometer for measuring the orientation of the rangefinder 100. The direction sensor 113 is configured to measure the zenith (or polar) angle of the target object (i.e. the elevation angle between an imaginary horizontal plane and an imaginary line connecting the rangefinder 100 and the target object, and the azimuthal angle of the target object with respect to a fixed reference (e.g. magnetic pole).

The direction measuring unit 111 is configured to obtain a sequence of samples of the direction to the target object ("direction samples"). To achieve this, the direction sensor 113 is configured to output samples of the measured direction (e.g. periodically) at a certain frequency. The direction measuring unit 111 may be configured to obtain direction samples corresponding to respective distance samples obtained by the distance measuring unit 101. In this case, the distance to the target object at a given sampling time may be given by a certain distance sample, and the direction to the target object at the same sampling time may be given by a corresponding direction sample.

The processor 107 is configured to compute the position of the target object (e.g. relative to the rangefinder) using a measured distance to the target object and a corresponding measured direction to the target object. For example, the position may be expressed in terms of spherical coordinates (r, θ, φ) with the radial coordinate, r, given by the line-of-sight distance obtained from the distance measuring unit 101, and the polar, θ, and azimuthal, φ, coordinates given respectively by the polar and azimuthal angles obtained by the direction measuring unit 111. The computed position may be expressed in, or converted to, any suitable coordinate system, for example Cartesian coordinates (x, y, z). The "distance samples" obtained from the distance measuring unit 101 and the "direction samples" obtained from the direction measuring unit 111 may be combined to form corresponding "position samples".

The rangefinder 100 further comprises a memory or storage 117 for storing the position samples. For example, the memory may comprise one or more buffers (e.g. ring buffers). The processor 107 is configured to store the position samples in the memory 117, for example as the samples are obtained.

In certain embodiments, the rangefinder 100 may further comprise a position determining unit 115 for determining the absolute position of the rangefinder 100 (e.g. expressed in terms of latitude, longitude and altitude). The absolute position of the rangefinder 100 and the position of the target object relative to the rangefinder may be used to determine the absolute position of the target object. For example, the position determining unit 115 may take measurements using (i) a Global Navigation Satellite System (GNSS), such as the Global Positioning System (GPS) or Galileo, and/or (ii) using a local positioning system, such as a system in which signals are received from a set of (e.g. three or more) beacons having known positions and a position is computed based on triangulation, trilateration, multilateration or similar technique. In embodiments where the rangefinder 100 has a known (e.g. fixed) position, or in embodiments where the absolute position of the target object is not required, the position determining unit 115 may be omitted.

The position samples may be expressed in terms of relative positions or absolute positions (e.g. latitude, longitude and altitude). For example, in applications in which the rangefinder 100 typically moves during use, it may be more convenient to express a position sample in terms of an absolute position. On the other hand, in applications in which the rangefinder 100 is typically static during use, it may be more convenient to express a position sample in terms of a relative position (i.e. a position relative to the location of the rangefinder 100). The skilled person will appreciate that the present invention is not limited to these examples.

The processor 107 is configured to perform various operations, including operations for determining whether the target object has been validly acquired and/or operations for determining whether the target object is being validly tracked.

Figure 2:
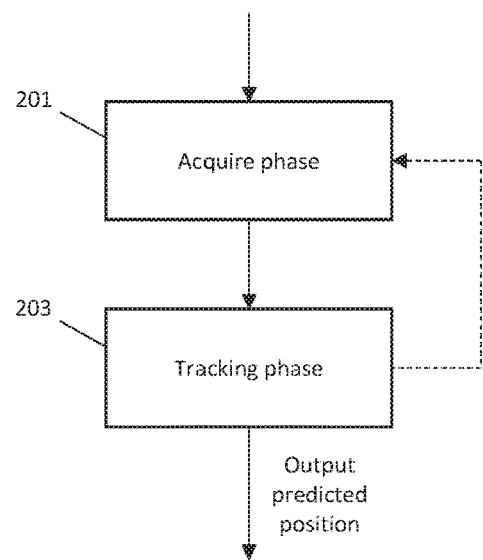
FIG. 2 is a flow diagram of an exemplary method that may be carried out in exemplary embodiments.

FIG. 2 illustrates a flow diagram of an exemplary method that may be carried out in exemplary embodiments. In a first step 201 an "acquire phase" is carried out, and after the acquire phase is complete, in a second step 203 a "tracking phase" is carried out.

The skilled person will appreciate that the acquire phase and the tracking phase may be carried out and/or used independently. For example, the tracking phase may be carried out without previously carrying out the acquire phase, for example if an estimated trajectory of the target object can be determined in another way. Conversely, the acquire phase may be carried out without subsequently carrying out the tracking phase, for example if the estimated trajectory obtained by the tracking phase is used for another purpose.

Exemplary implementations of the acquire phase and tracking phase are described in greater detail below. However, the skilled person will appreciate that many possible implementations and variations are possible, which may be optimised, for example for accuracy, stability and/or computational speed. In addition, the skilled person will appreciate that, in the following description, the values of the various parameters and thresholds may be be modified (e.g. optimised) based on the specific implementation.

Acquire Phase

Figure 3:
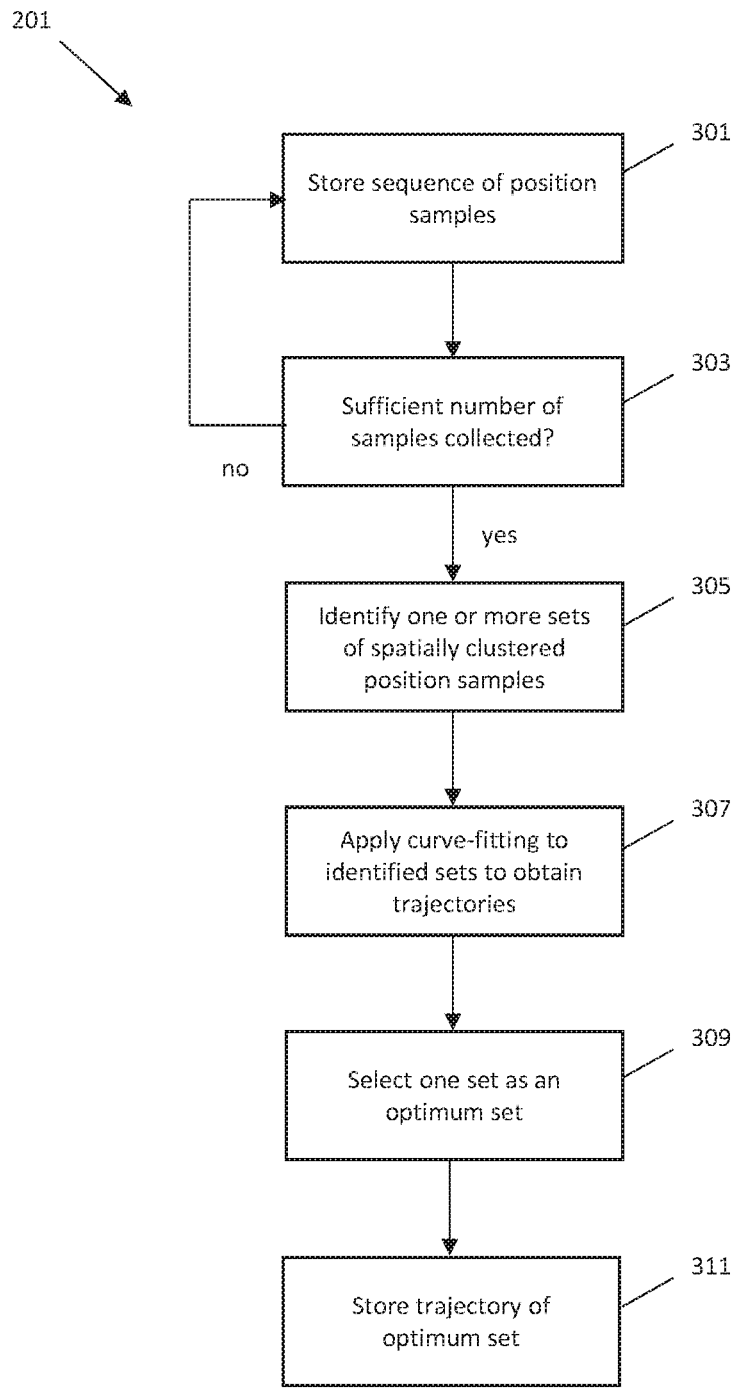
FIG. 3 is a flow diagram illustrating an exemplary acquisition phase of FIG. 2 that may be used in exemplary embodiments.

Operations for determining whether the target object has been validly acquired may be referred to as an "acquire phase". FIG. 3 is a flow diagram illustrating an exemplary acquisition phase that may be used in exemplary embodiments.

In certain embodiments, the acquire phase may be initiated upon detection (e.g. by the processor 107) of a certain event, for example the pressing of a button by the user once the user has pointed the rangefinder at the target object.

In the acquire phase, in a first step 301, the processor 107 is configured to store a sequence of position samples collected over a certain time window. For example, the processor 107 may insert position samples into an acquisition buffer of the memory 117 as the position samples are obtained. The time window may be any suitable length, for example 0.5 s. If the sampling frequency is 200 Hz, for example, then the acquisition buffer may be 100 samples long to represent a time window of 0.5 s.

In certain embodiments, the acquisition buffer may be provided in the form of a ring buffer. In this case, when the buffer is full, a newest sample overwrites the oldest sample in the buffer. Therefore, the time window represented by the samples in the buffer is a moving time window of fixed duration that gradually shifts later in time as new samples are added to the buffer. However, the skilled person will appreciate that any other suitable type of buffer or any other suitable type of memory may be used.

In a next step 303, the processor 107 may determine whether a sufficient number of position samples have been collected for resuming the acquire phase. For example, the processor 107 may determine 107 that a sufficient number of position samples have been collected when the acquisition buffer is full. One or more additional or alternative criteria may be applied in step 303. For example, for determining whether to resume the acquire phase, the processor 107 may additionally or alternatively determine whether the spread of points in the spatial domain is greater than a predetermined threshold (e.g. 0.25 s).

A position sample may be stored in any suitable format or with any suitable representation. For example, each buffered position sample may comprise a quadruplet of values (t, $p_1$, $p_2$, $p_3$) where t is the time at which the sample was obtained (the "sampling time"), and $p_1$, $p_2$ and $p_3$ are the three-dimensional coordinates of the position corresponding to the sample. For example, using Cartesian coordinates $p_1$, $p_2$ and $p_3$ are the x, y and z coordinates respectively, and using spherical coordinates $p_1$, $p_2$ and $p_3$ are the radial distance, polar angle and azimuthal angle respectively. However, the skilled person will appreciate that any suitable coordinate system may be used. In certain embodiments, it may be convenient to store the coordinates of a position sample in more than one coordinate system. For example, in certain embodiments, each buffered position sample may comprise a quintuplet of values (t, x, y, z, r) where t is the sampling time, x, y and z are the Cartesian coordinates of the position corresponding to the sample, and r is the radial distance from the rangefinder 100 to the position corresponding to the sample.

One or more of the position samples may comprise null or invalid data. This may occur, for example, if the laser source 103 is pointing in a direction that results in no reflected beam arriving at the laser sensor 105 of the distance measuring unit 101 (for example if the laser source 103 is pointed at the sky or if the target object is too far away or does not sufficiently reflect the laser beam). In certain embodiments, null or invalid samples may be ignored in subsequent operations, for example the operations described below.

Figure 4:
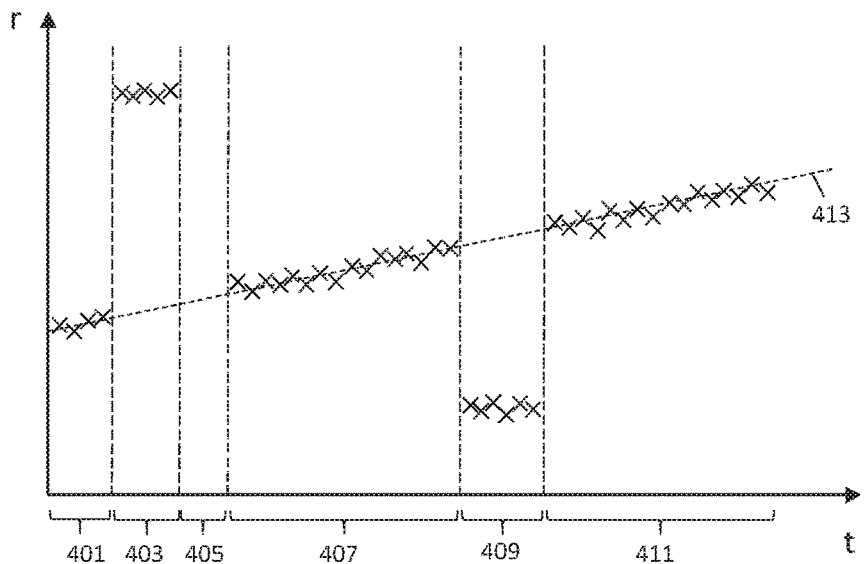
FIG. 4 is a graph illustrating position samples acquired over a time window.

FIG. 4 is a graph illustrating buffered position samples acquired over the time window. In particular, the horizontal axis represents time, the vertical axis represents radial distance, and each cross represents a position sample. FIG. 4 illustrates three time periods 401, 407, 411 during which the position samples represent valid data corresponding to the target object. The trajectory of the target object is represented in FIG. 4 as a dotted line 413, which rises from left to right in FIG. 4 because the target object is moving further away during the time window. FIG. 4 also illustrates a time period 405 during which the position samples represent null or invalid data. FIG. 4 also illustrates two time periods 403, 409 during which the position samples represent spurious data corresponding to a first object (in period 403) and a second object (in period 409) other than the target object.

If it is determined in step 303 that an insufficient number of position samples have been collected, or there is insufficient spread in the samples, then the method returns to step 101 where one or more position samples are collected. On the other hand, if it is determined in step 303 that a sufficient number of position samples have been collected, then the method proceeds to a next step 305.

In step 305, the processor 107 identifies one or more sets (or groups) of position samples, from among the position samples stored in the acquisition buffer, such that each set comprises position samples that are spatially clustered (and in certain embodiments, optionally temporally clustered).

The aim of this step is to identify at least one set of position samples that contains only (or substantially only) position samples corresponding to measurements of the target object. Other sets or potential sets may contain position samples corresponding to measurements of objects other than the target object, or may contain a mixture of position samples corresponding to measurements of both the target object and other objects. However, by suitable analysis of the sets or potential sets, sets containing only position samples corresponding to measurements of the target object may be retained, while other sets may be rejected.

As will be described in greater detail below, a curve-fitting algorithm may be applied to a set of spatially clustered position samples to determine a trajectory corresponding to the set of position samples. By retaining sets containing only position samples corresponding to measurements of the target object and rejecting other sets, the trajectory of the target object may be determined with relatively high confidence.

Spatial clustering may be defined in any suitable way. For example, a set of points (position samples) may be regarded as spatially clustered if every point in that set is no more than a predetermined threshold distance away from at least a predetermined number (e.g. 1) of other points in the same set. In another example, a set of points may be regarded as spatially clustered if all points in that set lie within a volume that is not larger than a predetermined size. In yet another example, a set of points may be regarded as spatially clustered only if the spatial density of points is greater than a predetermined threshold. In another example, a set of points may be regarded as spatially clustered if consecutive points are no more than a predetermined threshold distance away from each other. The skilled person will appreciate that any other suitable definitions of spatial clustering may be applied, and that any definitions may be applied individually or in combination.

Spatial clustering may be defined based on any suitable coordinate components. For example, spatial clustering may be defined based on the three-dimensional distance between points, or alternatively based on the distance between points considering only components along one or two axis. For example, in the embodiment described below, spatial clustering may be defined based on radial distance only. In the above examples, depending on the number of dimensions considered, references to "distance" may be understood as meaning one, two or three-dimensional distance as appropriate. Similarly, depending on the number of dimensions considered, references in the examples above to "volume" may be understood as meaning linear distance, area or volume as appropriate.

Figure 5:
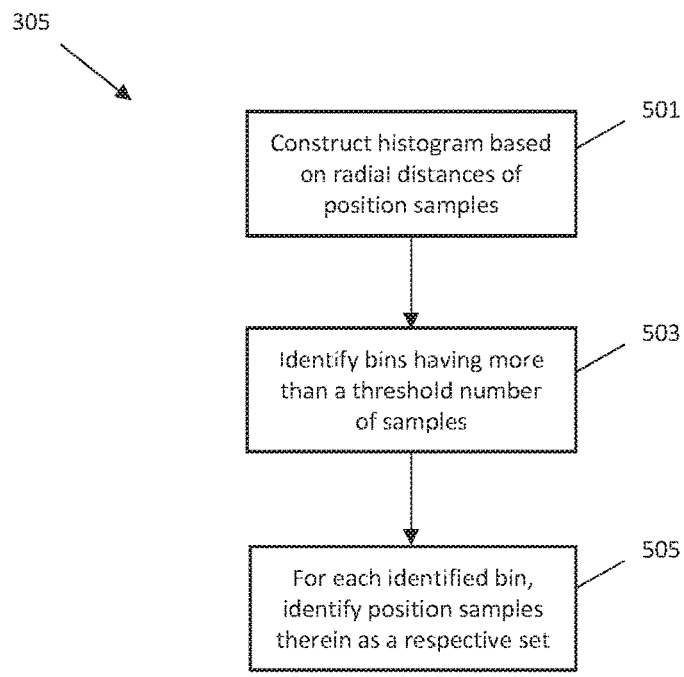
FIG. 5 is a flow diagram of an exemplary technique for identifying one or more set of spatially clustered position samples.

One exemplary technique for identifying one or more sets of spatially clustered position samples from among samples stored in the acquisition buffer in step 305 will now be described with reference to FIG. 5. This technique involves constructing a histogram based on the radial distances of the position samples. However, the skilled person will appreciate that the present invention is not limited to this specific example. Furthermore, the skilled person will appreciate that any suitable equivalent technique that produces the same or similar results, but that does not require construction of a histogram, or that is not based on radial distance, may be used in certain embodiments.

In a first step 501, a histogram is constructed based on the radial distances of the position samples stored in the buffer. Each bin of the histogram represents a certain range of radial distances. For example, a position sample is placed in the nth bin if the radial distance r of that sample satisfies $r^{(n)}_{lower} \leq r < r^{(n)}_{upper}$, where $r^{(n)}_{lower}$ and $r^{(n)}_{upper}$ are the lower and upper bounds corresponding to the nth bin. In certain embodiments, each bin may have the same width w such that $r^{(n)}_{upper} = r^{(n)}_{lower} + w$, $\forall n$. In certain embodiments, the ranges represented by adjacent bins may at least partially overlap, for example such that $r^{(n)}_{lower} < r^{(n+1)}_{lower} < r^{(n)}_{upper}$, and $r^{(n+1)}_{upper} > r^{(n)}_{upper}$, $\forall n$. Overlapping bins may be used, for example, to smooth the histogram. In one specific example, the first bin represents radial distances from 0-4 m, the second bin represents radial distances from 2-6 m, the third bin represents radial distances from 4-8 m, and so on. Accordingly, the histogram gives the frequency of position samples having radial distances falling into ranges corresponding to respective bins.

In a next step 503, any bins populated by more than a predetermined threshold number of samples (e.g. 10 samples) are identified.

In a next step 505, for each bin identified in the previous step 503, the position samples within the bin are identified as a respective set of spatially clustered position samples.

The skilled person will appreciate that the present invention is not limited to the specific example described above. For example, in an alternative embodiment, samples within any bins populated by more than a predetermined threshold number of samples and forming a contiguous set of bins may be identified as a set of spatially clustered samples.

Furthermore, the skilled person will appreciate that the present invention is not limited to techniques involving the construction of a histogram. For example, another exemplary technique for identifying one or more sets of spatially clustered position samples in step 305 will now be briefly described. In a first step, a first position sample is removed from the acquisition buffer and added to a first set. Next, the remaining position samples in the acquisition buffer are searched to identify any position samples that are spatially close to (i.e. within a threshold distance from) the first position sample already added to the first set, and these identified position samples are also removed from the acquisition buffer and added to the first set. The preceding operation is repeated iteratively so that, in each iteration, the remaining position samples in the acquisition buffer are searched to identify any position samples that are spatially close to the position samples already added to the first set, and these identified position samples are also removed from the acquisition buffer and added to the first set. The iterative operation is repeated until no more position samples can be added to the first set, at which point the position samples in the first set are identified as a set of spatially clustered position samples. Next, the entire process previously described is repeated from the first step to generate one or more further sets. When no further sets can be generated, the algorithm ends. In a modification to this algorithm, a searched position sample is only removed from the acquisition buffer and added to the first set if there exists at least one position sample already added to the first set that is both spatially close and temporally close to (i.e. within a threshold time from) the searched position sample.

In the acquire phase, in some (but not necessary all) scenarios it may be assumed that the radial distance of the target object and the radial distance of other objects (e.g. spurious objects) are significantly different. In this case, by separating the buffered position samples into sets of spatially clustered position samples, spurious samples (representing measurements of objects other than the target object), and valid samples (representing measurements of the target object) will typically be separated into different sets of spatially clustered position samples.

Furthermore, in some (but not necessary all) scenarios it may be assumed that a relatively high proportion of the buffered position samples correspond to measurements of the target object, and a relatively low proportion of the buffered position samples correspond to measurements of objects other than the target object. In this case, by identifying potential sets of spatially clustered samples that have less than a predetermined number of position samples (e.g. identifying histogram bins containing fewer than the predetermined number of position samples in the above example), sets containing only position samples corresponding to measurements of the target object may be selectively retained.

Accordingly, the trajectory estimated based on retained sets may be assumed, with relatively high confidence, to represent the trajectory of the target object during the period represented by the time window.

The skilled person will appreciate that embodiments of the present invention are not limited to the above scenarios. For example, in other scenarios a relatively high proportion of the samples may correspond to the background while a relatively low proportion of the samples may correspond to the target object. However, position samples corresponding to the target object may be more likely to be consistent with a well-defined trajectory (e.g. linear or quadratic trajectory) than samples corresponding to the background. Embodiments of the present invention are also effective in these other scenarios.

A more detailed description of exemplary curve-fitting techniques that may be applied in exemplary embodiments will now be described. In the following techniques, the processor 107 may apply a curve-fitting algorithm to each set of spatially clustered position samples, to identify the current trajectory of the target object, thereby allowing the processor 107 to predict the values of one or more motion parameters (e.g. position, velocity and/or acceleration) of the target object a short time into the future. One example of a curve-fitting algorithm is described below. However, the skilled person will appreciate that the present invention is not limited to this specific example.

In certain embodiments, curve-fitting may be applied based on three-dimensional components of the position samples to identify the trajectory of the target object in three dimensions. For example, in the following example, curve-fitting is applied based on the Cartesian coordinates (x, y and z) of each position sample (data point). The skilled person will appreciate that suitable coordinate systems may be used.

The trajectory of the target object may be represented parametrically. For example, the x, y and z coordinates of the target object may each be expressed as a respective function of a time parameter, t:

$x(t)=f_x(t)$ $y(t)=f_y(t)$ $z(t)=f_z(t)$

In the following example, the trajectory of the target object may be estimated by three curves, one estimated in each dimension using the least-squares method. However, the skilled person will appreciate that the present invention is not limited to techniques in which the trajectory is separately estimated in individual dimensions, and is not limited to the least-squares method.

In the following, curve-fitting is applied to a set of n+1 samples, where the ith sample (i=0, 1, . . . , n) comprises the quadruplet of values $\{t_i, x_i, y_i, z_i\}$. In this example, the parametric functions are assumed to be approximated by quadratic functions of the form:

$f_x(t)=a_x t^2+b_x t+c_x$ $f_y(t)=a_y t^2+b_y t+c_y$ $f_z(t)=a_z t^2+b_z t+c_z$ where the polynomial coefficients $a_x$, $b_x$, $c_x$, $a_y$, $b_y$, $b_y$, $a_z$, $v_z$, $c_z$, need to be determined.

For the x component of the target object's trajectory, the least squares method involves minimising the vector of residuals ($\underline{\varepsilon}$) for the following matrix equation:

$$\begin{bmatrix} x_0 \\ \vdots \\ \vdots \\ x_n \end{bmatrix} = \begin{bmatrix} t_0^2 & t_0 & 1 \\ \vdots & \vdots & \vdots \\ \vdots & \vdots & \vdots \\ t_n^2 & t_n & 1 \end{bmatrix} \begin{bmatrix} a_x \\ b_x \\ c_x \end{bmatrix} + \begin{bmatrix} \varepsilon_0 \\ \vdots \\ \vdots \\ \varepsilon_n \end{bmatrix}$$

The skilled person will readily appreciate the equivalent matrix equations for the y and z coordinates (that is, by substituting y or z labels for x labels in the above equation). Any suitable method may be used for solving the above equation, numerous examples of which are known to the skilled person.

The skilled person will appreciate that a polynomial is only one of many types of equation that could be used for modelling the target object's trajectory and the present invention is not limited to any specific example. For example, in certain embodiments the quadratic term may be omitted, for example if the target object is assumed to have no acceleration. Furthermore, in other exemplary embodiments, higher order polynomials may be used. However, in some cases, using higher order polynomials may produce less stable results for a relatively small gain in accuracy.

Returning to FIG. 3, in a next step 307, curve-fitting (e.g. the curve-fitting algorithm described above) is applied to each of the sets of position samples identified in step 305.

In a next step 309, if more than one set was identified in step 305, then one set may be selected as an optimum (or best) set.

The optimum set may be selected based on any suitable criteria. For example, in certain embodiments the curve-fitting algorithm described above may be applied to each set, and the set having the best fitting curves (e.g. determined based on the values of the residuals) may be selected as the optimum set. In one example, for each set, the sum of the squared residuals (i.e. the value of $\varepsilon_0^2+\varepsilon_1^2+ \ldots +\varepsilon_n^2$) in each dimension is calculated and the highest value is selected as a representative error for that set. Then, the set with the lowest representative error may be selected as the optimum set. In certain embodiments, other criteria may be used as a factor in selecting the optimum set. For example the number of samples in each set may be taken into account, where a higher number of samples is regarded as providing a more reliable set.

The quality, accuracy or reliability of a certain set may be measured based on any suitable set of one or more criteria. Any set having a measured quality, accuracy or reliability below a predetermined threshold may be discarded. If no set has a measured quality, accuracy or reliability that is greater than or equal to the threshold then this may indicate that the target object has not been being validly acquired (e.g. the user is not directing the laser beam at the target object with sufficient accuracy). Conversely, if there is at least one set having a measured quality, accuracy or reliability that is greater than or equal to the threshold then this may indicate that the target object has been validly acquired (e.g. the user is directing the laser beam at the target object with sufficient accuracy).

In certain embodiments, the processor 107 may control the rangefinder 100 to alert or inform the user (e.g. using visual, audible or tactile feedback) if the target object has been validly acquired and/or if the target object has not been validly acquired.

For example, the quality, accuracy or reliability of a certain set of spatially clustered position samples may be measured based on the residuals. In certain embodiments, for a given set, the sum of the squared residuals (i.e. the value of $\varepsilon_0^2+\varepsilon_1^2+ \ldots +\varepsilon_n^2$) in each dimension is calculated and the highest value is selected as a representative error for that set. Then, if the representative error of a set is greater than a predetermined threshold then that set may be regarded as having an insufficient quality, accuracy or reliability.

Curve-fitting applied to sets containing only position samples corresponding to measurements of the target object will typically produce betting fitting curves than curve-fitting applied to sets containing a mixture of position samples corresponding to measurements of both the target object and other objects. Accordingly, by selecting an optimum set and/or by discarding sets whose quality, accuracy or reliability is below a predetermined threshold, sets containing only position samples corresponding to measurements of the target object are more likely to be retained.

If it is determined that the target object has not been validly acquired based on the position samples currently buffered in the acquisition buffer, then the acquire phase may be repeated once a certain number of new position samples have been added to the acquisition buffer. In some embodiments, the acquire phase may be repeated once a single new position sample has been added to the acquisition buffer. In other embodiments, the acquire phase may be repeated once all current position samples in the acquisition buffer have been replaced with new positions samples.

In a next step 311, the trajectory of the optimum set selected in step 309 (which is assumed to be the trajectory of the target object) is stored for use in the tracking phase. At this point, the acquire phase is complete and the process moves to the tracking phase.

Tracking Phase

Figure 6:
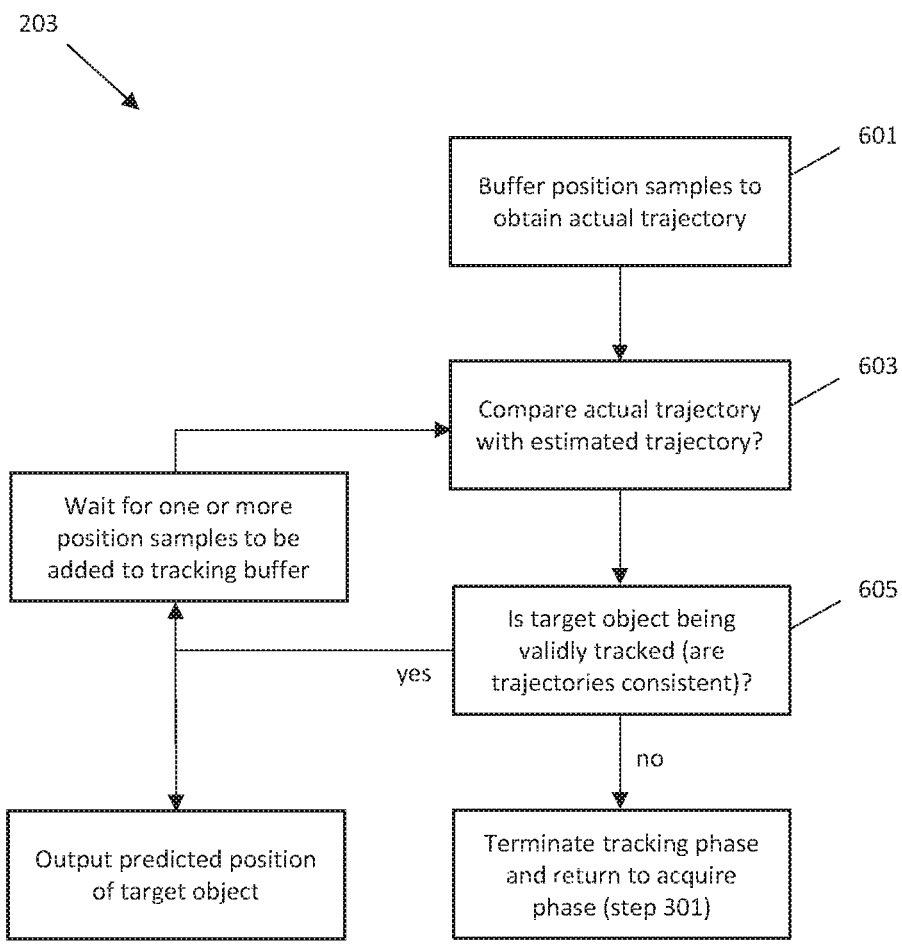
FIG. 6 is a flow diagram illustrating an exemplary tracking phase of FIG. 2 that may be used in exemplary embodiments.

Operations for determining whether the target object is being validly tracked may be referred to as a "tracking phase". The tracking phase may be initiated once the processor 107 has determined, as a result of the acquire phase, that the target object has been validly acquired and the trajectory of the target object has been estimated. FIG. 6 is a flow diagram illustrating an exemplary tracking phase that may be used in exemplary embodiments.

During the tracking phase, in a first step 601, the position of the target object is continually sampled to obtain an actual measured trajectory of the target object.

The position samples collected during the tracking phase may be stored in any suitable memory, for example a tracking buffer. The tracking buffer may be any suitable length (e.g. 100 samples long). A position sample may be deleted from the tracking buffer when it is too old (e.g. when the time since the position sample was captured is above a certain threshold). For example, the tracking buffer may be provided in the form of a ring buffer such that when the buffer is full, a newest sample overwrites the oldest sample in the buffer. In certain embodiments, the processor 107 may initialise the tracking buffer by populating the tracking buffer with values computed using the stored trajectory determined in the acquire phase. In this case, these initial values are gradually overwritten by newly measured position samples.

In the following exemplary embodiment, the tracking buffer is a different buffer from the acquisition buffer. However, in other embodiments the acquisition buffer and the tracking buffer may be the same buffer.

In certain embodiments, position samples may be buffered during the tracking phase at a lower frequency (e.g. 50 Hz) than position samples buffered during the acquire phase. In this case, some of the samples generated by the rangefinder 100 may be discarded, for example such that only every kth sample (e.g. every fourth sample) generated by the rangefinder is buffered in the tracking buffer.

In certain embodiments, position samples may continue to be buffered in the acquire buffer (e.g. at a higher rate) during the tracking phase. In certain embodiments, the processor 107 may be configured to execute the acquire phase concurrently with the tracking phase, for example so that if the tracking phase is terminated and processing returns to the acquire phase, the acquire phase can be potentially completed more quickly and processing may potentially return to the tracking phase sooner.

In a next step 603, the processor 107 determined whether the actual measured trajectory (or the collected position samples) is (or are) consistent with the estimated trajectory determined in the acquire phase (or positions computed from the estimated trajectory).

For example, each time a measured position sample (data point) is obtained, the measured position is compared with the expected position computed based on the estimated trajectory. If the measured position is sufficiently close (e.g. within a predetermined threshold, for example ±2 m) to the expected position, then the position sample is accepted, otherwise it is discarded. Discarded position samples may be either not written to the tracking buffer, or deleted from the tracking buffer if already written there. Depending on the curve-fitting algorithm being used, it may be useful to keep equally spaced position samples in the tracking buffer. In this case, a discarded position sample may be substituted with a position sample representing the expected position calculated based on the estimated trajectory, but marked as 'fake'.

Each time a certain number of position samples (e.g. 1) are added to the tracking buffer, the processor 107 determines whether the position samples buffered in the tracking buffer satisfy one or more criteria, for example indicating that the buffered position samples are of sufficient quality, reliability or accuracy. For example, one exemplary criterion is that more than a certain number (e.g. 10) of accepted position samples are in the tracking buffer. Another exemplary criterion is that there is less than a certain time interval (e.g. 300 ms) between the oldest and the newest accepted position samples in the tracking buffer. The skilled person will appreciate that one or more alternative or additional criteria may be applied.

In certain embodiments, each time a 'real' point is accepted into the tracking buffer, the trajectory may be updated using a suitable curve-fitting algorithm, for example in each of the dimensions. For example, the trajectory may be updated to take into account the accepted point.

In certain embodiments, points that are too old (i.e. the time since the corresponding sample was collected is greater than a predetermined threshold) may be discarded or ignored, and the trajectory may be updated to take into account the discarding of such points.

The skilled person will appreciate that step 603 is not limited to the specific example described above. For example, in another technique, all measured position samples may be written to the tracking buffer and each measured position sample may be assigned a score according to one or more factors, for example how close the measured position is to the expected position computed based on the estimated trajectory (e.g. with higher scores assigned to closer positions). In certain embodiments the score assigned to a given position sample may change (e.g. fall) as the age of the position sample increases, for example to give greater weight to more recent position samples. The quality, reliability or accuracy of the position samples in the tracking buffer may be measured based on any suitable function of the position sample scores, for example an average of the scores.

In a next step 605, if the measured trajectory is sufficiently consistent with the estimated trajectory (e.g. the buffered position samples satisfy the one or more criteria), then the processor 107 determines that the target object is being validly tracked. On the other hand, if the measured trajectory is not sufficiently consistent with the estimated trajectory, then the processor 107 determines that the target object is not being validly tracked. This step may be performed implicitly in certain embodiments. For example, if there are enough points, sufficiently spaced to satisfy the criteria described above, then the tracking may be maintained.

In certain embodiments, the processor 107 may control the rangefinder 100 to alert or inform the user (e.g. using visual, audible or tactile feedback) if the target object is being validly tracked and/or if the target object is not being validly tracked.

If the processor 107 determines in step 605 that the target object is being validly tracked, then the process may wait for a certain number (e.g. 1) of position samples to be added to the tracking buffer and then return to step 603 to repeat the process. On the other hand, if the processor 107 determines in step 605 that the target object is not being validly tracked, then it may be assumed that the target object has been "lost". In this case, the tracking phase may terminate and the process may return to the beginning of the acquire phase. For example, the target object may be lost if the actual trajectory of the target object deviates from the estimated trajectory, or if the user is no longer pointing the rangefinder at the target object with sufficient accuracy.

In certain exemplary embodiments, when the processor 107 has determined that the target object is being validly tracked, the processor 107 is configured to compute a position at which the target object is predicted to be at a certain time in the future based on the estimated trajectory. Such a predicted position may be used in a number of different applications.

For example, the rangefinder 100 may be incorporated into a system for capturing, immobilising or disabling an aerial vehicle or other object. In one such exemplary system, described in International Patent Application No. PCT/GB2016/051139, a launcher may be used to launch a projectile containing a net (or other object for capturing, immobilising or disabling the aerial vehicle) towards the aerial vehicle, and when the projectile is in the vicinity of the aerial vehicle, the net is deployed from the projectile to capture the aerial vehicle. The net may be deployed from the projectile at a time according to a timing parameter computed by the launcher and programmed into the projectile prior to launch. An aiming system may be provided to assist the user in aiming the launcher.

During the projectile flight time, that is between initial projectile launch and net deployment, the aerial vehicle may move. Accordingly, in order to achieve correct aim of the launcher, and in order to accurately calculate the timing parameter, it is important to be able to predict the position of the aerial vehicle a short time (i.e. the flight time) into the future. Embodiments of the present invention may provide a reliable prediction to the system.

The invention claimed is:

1. A rangefinder device to acquire a remote object, the rangefinder device being configured to:
   obtain a sequence of position samples of the remote object;
   identify one or more sets of spatially clustered position samples from among the obtained position samples;
   select a set of spatially clustered position samples from among the identified sets of spatially clustered position samples based on one or more of: the number of samples in each set; and a quality, accuracy and/or reliability value of each set; and
   apply curve-fitting to the selected set of spatially clustered position samples to obtain a trajectory of the selected set of spatially clustered position samples.

2. The rangefinder device according to claim 1, wherein obtaining a position sample comprises:
   measuring the line-of-sight distance to the object;
   measuring the direction of the object; and
   computing the position of the remote object using the measured distance and measured direction.

3. The rangefinder device according to claim 1, wherein the position samples are obtained during a certain time window.

4. The rangefinder device according to claim 1, wherein identifying one or more sets of spatially clustered position samples comprises:
   constructing a histogram based on the radial distances of the obtained position samples;
   identifying histogram bins populated by more than a threshold number of samples;
   for each identified bin, identifying the position samples within the bin as a respective set of spatially clustered position samples.

5. The rangefinder device according to claim 4, wherein the histogram comprises overlapping bins.

6. The rangefinder device according to claim 1, further comprising, if two or more sets of spatially clustered position samples are identified, selecting one of the sets as an optimum set.

7. The rangefinder device according to claim 6, wherein curve-fitting is applied to each set, and wherein the set having the best fitting curve is selected as the optimum set.

8. The rangefinder device according to claim 6, wherein the curve-fitting comprises the least-squares method, and wherein the optimum set is selected based on the least-squares residuals.

9. The rangefinder device according to claim 1, wherein the curve fitting is applied separately to each spatial component of the position samples.

10. The rangefinder device according to claim 1, further comprising computing a quality value for each set, and discarding a set if the quality value for that set is below a threshold.

11. The rangefinder device according to claim 10, wherein the curve-fitting comprises the least-squares method, and wherein the quality value is computed based on the least-squares residuals.

12. The rangefinder device according to claim 10, wherein the method further comprises, if no set has a quality value that is greater than or equal to the threshold, determining that the object has not been validly acquired.

13. The rangefinder device according to claim 12, wherein, when it is determined that the object has not been validly acquired, repeating the obtaining, identifying, and applying steps.

14. The rangefinder device according to claim 10, further comprising, if at least one set has a quality value that is greater than or equal to the threshold, determining that the object has been validly acquired.

15. The rangefinder device according to claim 12, further comprising storing the trajectory of at least one set having a quality value that is greater than or equal to the threshold.

16. A rangefinder device to track a remote object, the rangefinder device being configured to:
obtain an estimated trajectory of the object;
obtain one or more position samples of the object;
compare the obtained position samples with positions computed based on the estimated trajectory; and
determine that the object is being tracked based on whether the obtained position samples are consistent with the computed positions.

17. The rangefinder device according to claim 16, wherein determining that the object is being tracked comprises determining whether at least a threshold number of position samples collected within a threshold time are within a threshold distance from the respective computed positions.

18. The rangefinder device according to claim 16, further comprising, when it is determined that the object is being tracked, repeating the steps of obtaining one or more position samples, comparing, and determining.

19. The rangefinder device according to claim 16, further comprising, when it is determined that the object is being tracked, predicting position of the object at a certain time in the future based on the trajectory.

20. The rangefinder device according to claim 1, the rangefinder device being further configured to:
obtain an estimated trajectory of the object based on the obtained trajectory of the set of spatially clustered position samples;
obtain one or more further position samples of the object;
compare the obtained further position samples with positions computed based on the estimated trajectory; and
determine whether the object is being tracked based on whether the obtained further position samples are consistent with the computed positions.

* * * * *